US012603602B2

(12) United States Patent (10) Patent No.: US 12,603,602 B2
Patil et al. (45) Date of Patent: Apr. 14, 2026

(54) ROOF-MOUNTED SOLAR PANEL ASSEMBLY FOR VEHICLES

(71) Applicant: Honda Motor Co., Ltd., Tokyo (JP)

(72) Inventors: Amitkumar B. Patil, Marysville, OH (US); Stephen D. Rosenkrantz, Columbus, OH (US); Cassandra Hodges De La Rosa, Columbus, OH (US); Robert Reames, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 18/440,660

(22) Filed: Feb. 13, 2024

(65) Prior Publication Data

US 2025/0260359 A1 Aug. 14, 2025

(51) Int. Cl.
H02S 20/30 (2014.01)
B60K 16/00 (2020.01)
B60L 8/00 (2006.01)
B62D 25/06 (2006.01)

(52) U.S. Cl.
CPC .............. H02S 20/30 (2014.12); B60K 16/00 (2013.01); B60L 8/003 (2013.01); B62D 25/06 (2013.01); B60K 2016/003 (2013.01)

(58) Field of Classification Search
CPC ... B60K 16/00; B60K 2016/003; B60L 8/003; B62D 65/16; B62D 25/06; H02S 20/30
See application file for complete search history.

(56) References Cited

U.S. PATENT DOCUMENTS

| | | | | |
|---|---|---|---|---|
| 6,313,394 | B1* | 11/2001 | Shugar | B60L 8/003 |
| | | | | 180/2.2 |
| 6,423,894 | B1* | 7/2002 | Patz | B60J 7/00 |
| | | | | 180/2.2 |
| 7,884,569 | B2* | 2/2011 | Ward | B60L 8/003 |
| | | | | 180/2.2 |
| 9,278,617 | B2 | 3/2016 | Shirai et al. | |
| 11,230,335 | B2 | 1/2022 | Kobayashi | |
| 11,279,210 | B2 | 3/2022 | Kim | |
| 2015/0197150 | A1* | 7/2015 | Shirai | H02S 30/10 |
| | | | | 180/2.2 |
| 2022/0379968 | A1* | 12/2022 | Runius | B62D 25/02 |

FOREIGN PATENT DOCUMENTS

| | | |
|---|---|---|
| CN | 206358005 U | 7/2017 |
| CN | 108638873 A | 10/2018 |
| CN | 212098452 U | 12/2020 |
| CN | 212654215 U | 3/2021 |

(Continued)

*Primary Examiner* — Timothy Hannon
(74) *Attorney, Agent, or Firm* — Morgan Lincoln; American Honda Motor Co., Inc.

(57) ABSTRACT

A roof-mounted solar panel assembly is provided. The roof-mounted solar panel assembly includes a slider component disposed at a roof molding recess area of a vehicle. The slider component has a first portion and a second portion. The first portion located at a first height from the roof molding recess area and the second portion located at a second height from the roof molding recess area. The roof-mounted solar panel assembly further includes a solar panel removably coupled to the second portion of the slider component at a third height, which is less than the second height of the second portion.

20 Claims, 5 Drawing Sheets

(56)            References Cited

FOREIGN PATENT DOCUMENTS

| | | | |
|---|---|---|---|
| CN | 113212176 | A | 8/2021 |
| CN | 113715631 | A | 11/2021 |
| CN | 216252587 | U | 4/2022 |
| CN | 217183218 | U | 8/2022 |
| CN | 115675104 | A | 2/2023 |
| KR | 20190005365 | A | 1/2019 |
| KR | 102394787 | B1 | 5/2022 |

* cited by examiner

500

Dispose slider component at roof molding recess area of vehicle, which has first portion located at first height from roof molding recess area and second portion located at second height from roof molding recess area 502

↓

Couple solar panel to second portion of slider component at third height, which is less than second height of the second portion 504

ROOF-MOUNTED SOLAR PANEL ASSEMBLY FOR VEHICLES

BACKGROUND

Vehicles generally have multiple panels that may be joined based on various metal joining processes (such as, welding, riveting, etc.). For example, the vehicle may include a side panel and a roof panel, which may be joined at an interface based on a suitable metal joining process, such as a welding process. In certain instances, an operator in an assembly line of the vehicle may intend to conceal such interface to improve aesthetics of the vehicle. In such instances, the operator may couple a roof mold on the interface between the roof panel and the side panel, so that, such roof mold may conceal the interface and improve the aesthetics of the vehicle. However, as the roof mold performs no other function other than the improvement in the aesthetics of the vehicle, there may be a substantial wastage of a space of the roof panel. In few cases, such space may be utilized to install energy generation devices (for example, solar panels). However, such energy generation devices may be disposed at elevated heights from the roof of the vehicle, which may substantially impact aerodynamics of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a roof-mounted solar panel assembly is disclosed. The roof-mounted solar panel assembly may include a slider component disposed at a roof molding recess area of a vehicle. The slider component may have a first portion and a second portion. The first portion may be located at a first height from the roof molding recess area and the second portion may be located at a second height from the roof molding recess area. The roof-mounted solar panel assembly may further include a solar panel removably coupled to the second portion of the slider component at a third height, which may be less than the second height of the second portion.

According to an embodiment of the disclosure, roof-mounted solar panel assembly is provided. The roof-mounted solar panel assembly may include a slider component disposed at a roof molding recess area of a vehicle. The slider component may have a first portion and a second portion. The first portion may be located at a first height from the roof molding recess area and the second portion may be located at a second height from the roof molding recess area. The roof-mounted solar panel assembly may further include a solar panel that may be removably coupled to the second portion of the slider component and located within the second height.

According to another embodiment of the disclosure, a method for forming a roof-mounted solar panel assembly is provided. The method may include disposing a slider component at a roof molding recess area of a vehicle. The slider component may have a first portion and a second portion. The first portion may be located at a first height from the roof molding recess area and the second portion may be located at a second height from the roof molding recess area. The method may further include coupling a solar panel to the second portion of the slider component at a third height, which is less than the second height of the second portion.

Figure 1:
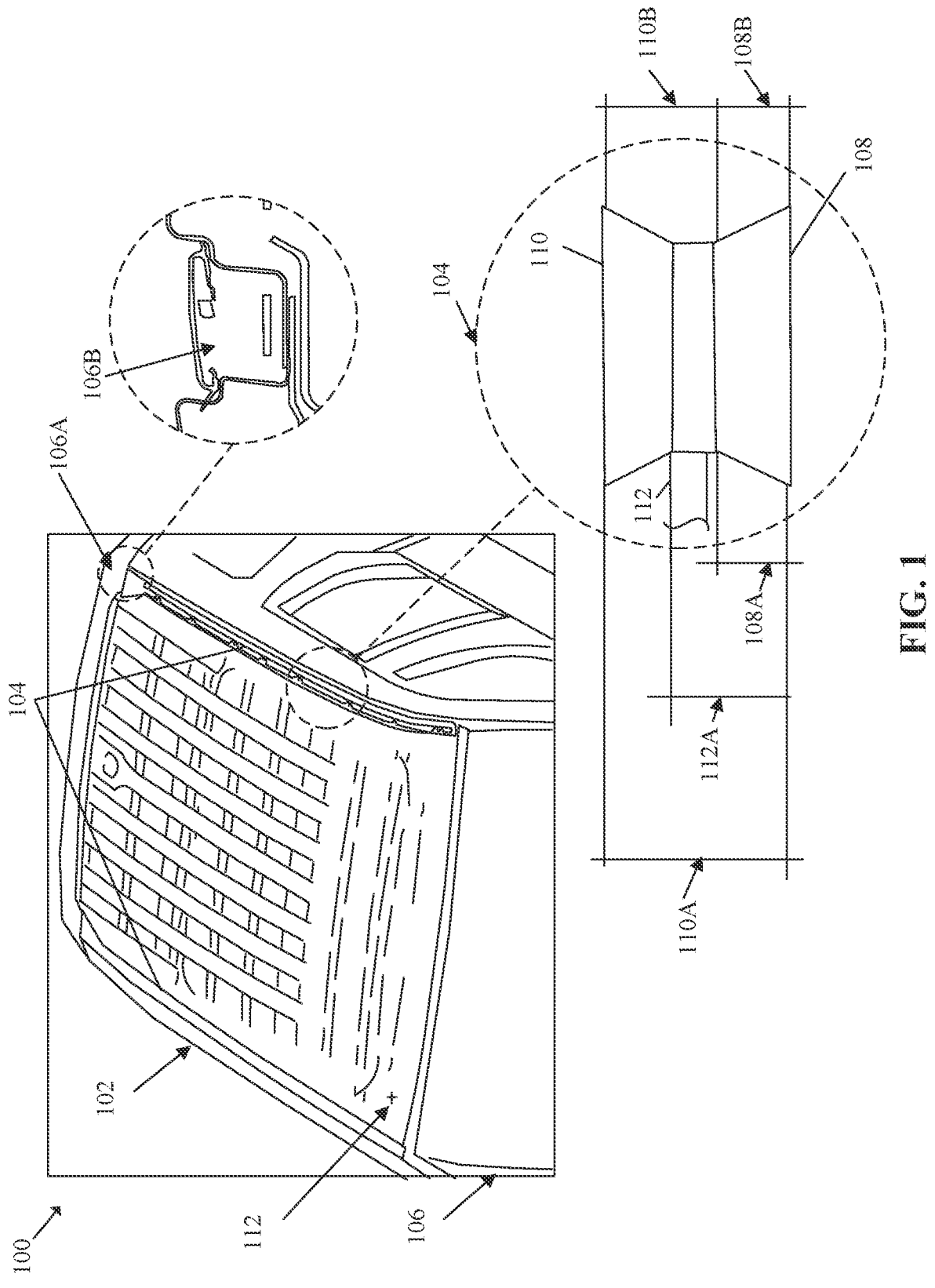
FIG. 1 is a diagram that illustrates an isometric view of a roof-mounted solar panel assembly for a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed roof-mounted solar panel assembly. The roof-mounted solar panel assembly may include a slider component (for example, an hourglass-shaped slider) disposed at a roof molding recess area (for example, an interface recess between a roof panel and a side panel) of a vehicle. The slider component may have a first portion (for example, a sub-structure of the hourglass-shaped slider) and a second portion (for example, a super-structure of the hourglass-shaped slider). The first portion may be located at a first height from the roof molding recess area. In an example, the first height may be equal to a height of the roof molding recess area measured from a roof of the vehicle. Therefore, as the first portion of the slider component is configured to be substantially flushed with the roof molding recess area, there may not be a requirement for a separate roof mold, and thus, improves aesthetics of the vehicle.

The second portion may be located at a second height from the roof molding recess area. In an example, the first portion may have a first length and the second portion may have a second length. In an embodiment, the first length may be substantially same as the second length. In another embodiment, the first length may be different from the second length. Such configuration facilitates the slider component to be disposed at a low-profile from the roof of the vehicle. Therefore, as the slider component is located at the low-profile from the roof of the vehicle, there may be substantial improvement in an aerodynamics of the vehicle in addition to the improvement in the aesthetics of the vehicle.

The slider component may also be used to hold other components (such as solar panels, cargos, etc.) on to the roof of the vehicle. For example, the roof-mounted solar panel assembly may further include a solar panel that may be removably coupled to the second portion of the slider component at a third height, which may be less than the second height of the second portion. Therefore, as the solar panel is also located at the low-profile from the roof of the vehicle, there may be further improvement in the aerodynamics of the vehicle in addition to the improvement in the aesthetics of the vehicle, despite assembling the solar panel in the vehicle.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an isometric view of a roof-mounted solar panel assembly for a vehicle, in accordance with an embodiment of the disclosure. With reference to FIG. 1, there is shown a perspective view 100 of a roof-mounted solar panel assembly 102. The roof-mounted solar panel assembly 102 may include a slider component 104 that may be disposed on a vehicle 106. The slider component 104 may include a first portion 108 and a second portion 110. The roof-mounted solar panel assembly 102 may further include a solar panel 112, which may be configured to be coupled to the second portion 110 of the slider component 104.

The roof-mounted solar panel assembly 102 may have a suitable design, shape, and structure, which may be configured to secure energy generating devices (such as, the solar panel 112) at a low-profile on the vehicle 106. For example, the roof-mounted solar panel assembly 102 may generally include multiple components, for example, the slider component 104 and the solar panel 112. The slider component 104 may be configured to slidably secure the solar panel 112 at the low-profile on the vehicle 106. In an embodiment, the roof-mounted solar panel assembly 102 may be located on a roof of the vehicle 106. In another embodiment, the roof-mounted solar panel assembly 102 may be located on a frontal portion of the roof of the vehicle 106. In yet another embodiment, the roof-mounted solar panel assembly 102 may be located on a rear portion of the roof of the vehicle 106. In yet another embodiment, the roof-mounted solar panel assembly 102 may be located on a complete surface area of the roof of the vehicle 106.

The roof-mounted solar panel assembly 102 may generally have a substantially rectangular low-profile, to improve aerodynamics of the vehicle 106. However, it may be noted that the substantially rectangular low-profile is merely an example and the roof-mounted solar panel assembly 102 may include any structural profile, for example, a square low-profile, a polygonal low-profile, and the like. Based on user requirements and structural aspects of the vehicle 106, such structural profile of the roof-mounted solar panel assembly 102 may be modified in the vehicle 106.

The vehicle 106 may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. It may be noted here that the vehicle 106 shown as the four-wheeler vehicle in FIG. 1, is merely shown as example. Other examples of the vehicle 106 may include, but are not limited to, a roof-covered single-wheeler vehicle, a roof-covered two-wheeler vehicle, a roof-covered three-wheeler vehicle, or a multi-wheeled vehicle. Description of other types of the vehicle 106 has been omitted from the disclosure for the sake of brevity. In certain cases, the vehicle 106 may also be a hybrid vehicle, or a vehicle with autonomous drive capability that uses one or more distinct renewable or non-renewable power sources. Examples of such renewable or non-renewable power sources-based vehicles, may include, but not limited to, a fossil fuel-based vehicle, an electric propulsion-based vehicle, a hydrogen fuel-based vehicle, a solar-powered vehicle, and/or a vehicle powered by other individual forms of alternative energy sources, or a combination of alternative energy sources. In an embodiment, the roof-mounted solar panel assembly 102 may be installed on a roof rail 106A of the vehicle 106.

The roof rail 106A may include a plurality of rails (for example, a left rail and a right rail) which may be secured to the roof of the vehicle 106. In an embodiment, the roof rail 106A may be located at the interface between the side panel and the roof panel of the vehicle 106. The roof rail 106A may be configured to secure components (such as the slider component 104 and the solar panel 112) of the roof-mounted solar panel assembly 102 at a roof molding recess area 106B of the vehicle 106.

The roof molding recess area 106B may be an interface between at least two-body panels (for example, the side panel or the roof panel) of the vehicle 106. In a preferred embodiment, the body panel may be processed using sheet metal stamping to enhance mechanical properties, as such, but not limited to, tensile strength, toughness, or fatigue strength. In an embodiment, the roof molding recess area 106B may be configured to receive the slider component 104. In another embodiment, the roof molding recess area 106B may be configured to receive the solar panel 112 in addition to the slider component 104. In yet another embodiment, the roof molding recess area 106B may be configured to directly receive the solar panel 112.

In an embodiment, the roof molding recess area 106B may be located on the roof rail 106A of the vehicle 106 and configured to be linearly disposed on the roof of the vehicle 106. In another embodiment, the roof molding recess area 106B may also be angularly located from an edge of the roof of the vehicle 106. In yet another embodiment, the roof molding recess area 106B may be located at a combination of linear and angular locations on the roof of the vehicle 106. In an embodiment, the roof molding recess area 106B may have a substantially C-shaped cavity. In another embodiment, the roof molding recess area 106B may also have at least two vertical and a bottom surface, stretched along a length of the roof molding recess area 106B, which may be configured to receive the slider component 104. In yet another embodiment, the roof molding recess area 106B may also have a substantially polygonal shaped cavity, which may be configured to receive the slider component 104.

The slider component 104 may have a suitable design, shape, and structure, which may be configured to be disposed at the roof molding recess area 106B of the vehicle 106. In an embodiment, the slider component 104 may be linearly disposed at the roof molding recess area 106B. In another embodiment, the slider component 104 may be angular disposed at the roof molding recess area 106B. In yet another embodiment, the slider component 104 may be configured to be disposed at a combination of linear and angular locations of the roof molding recess area 106B, via the roof rail 106A of the vehicle 106.

The slider component 104 may be configured to be disposed on both linear side edges of the vehicle 106, so that, the slider component 104 shall couple components (such as the solar panel 112) of the roof-mounted solar panel assembly 102 and are configured to completely or partially encompass over a surface area of the roof of the vehicle 106. Therefore, the roof of the vehicle 106 may be fully utilized for energy generation purposes of the vehicle 106. In an embodiment, the slider component 104 may be configured to releasably secure the solar panel 112.

In an embodiment, the slider component 104 may have an hour-glass profile, which may be configured to receive the solar panel 112 at a low-profile from the roof of the vehicle 106. The hour-glass profile of the slider component 104 is merely an example, and the slider component 104 may have any shapes and profiles, for example, a substantially C-shaped profile, a substantially V-shaped profile, a substantially W-shaped profile, and the like. In an example, the slider component 104 may have an arcuate profile, which may be configured to receive the solar panel 112. Such arcuate profile of the slider component 104 may secure the solar panel 112 in a cushioning fit, such that, there may be minimal to no wear and tear of the solar panel 112. In another example, the slider component 104 may also have a slot in the arcuate profile, such that, the solar panel 112 may substantially conform to the slot in the arcuate profile and improve fixation of the solar panel 112 on to the roof of the vehicle 106.

Figure 2:
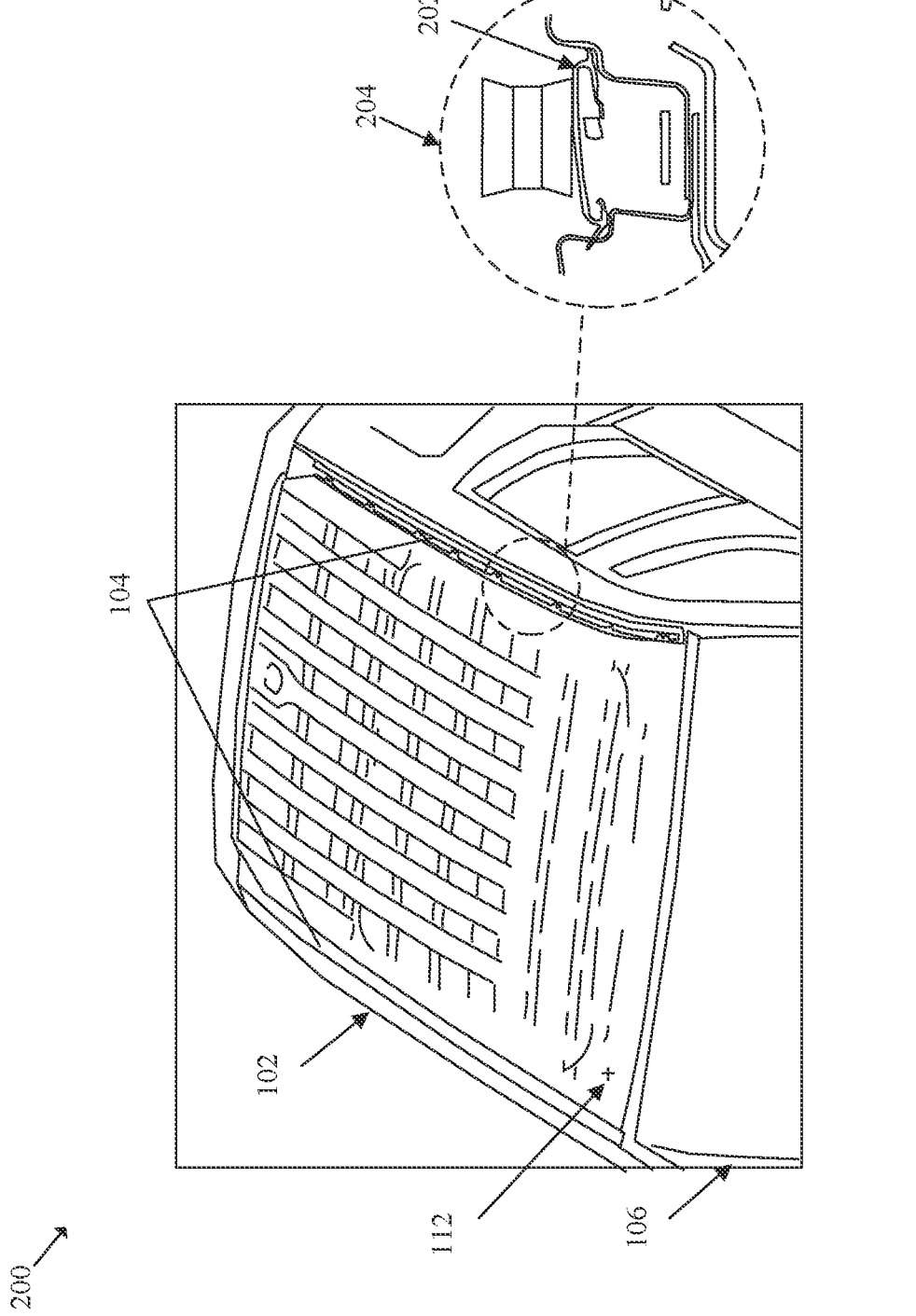
FIG. 2 is a diagram that illustrates a first exemplary scenario for a roof-mounted solar panel assembly of a vehicle, in accordance with an embodiment of the disclosure.

In another embodiment, the slider component 104 may be configured to engage with one of: the roof rail 106A or the roof molding recess area 106B, of the vehicle 106 based on user requirements. In an example, in case the roof mold is pre-assembled to the vehicle 106, the slider component 104 may be configured to be directly coupled with the roof mold of the vehicle as shown in FIG. 2. In another example, in case the roof mold is removed from the vehicle 106, or in case the roof mold is unavailable to conceal the roof molding recess area 106B, the slider component 104 may be configured to be directly coupled to the roof molding recess area 106B of the vehicle 106.

In yet another embodiment, the slider component 104 may be coupled with a plurality of end caps (not shown) on opposing ends. For example, the plurality of end caps may include a first end cap and a second end cap. The first end cap may be configured to be coupled at a first end of the slider component 104 and the second end cap may be configured to be coupled at a second end of the slider component 104. Such first end cap and the second end cap of the plurality of end caps are configured to prevent turbulence of air streaming over the vehicle 106. Further, the first end cap and the second end cap of the plurality of end caps may substantially ease streamlined air flow over the vehicle 106, that may prevent noise (for example, a cavity noise, or whistle) generated from the slider component 104 and may further improve aerodynamic of the vehicle 106.

In yet another embodiment, the slider component 104 may have the first portion 108 and the second portion 110, which may be integrally coupled with each other to form a unitary structure. In another embodiment, the slider component 104 may have the first portion 108 and the second portion 110, which may be removably coupled with each other to easily assemble the solar panel 112 between the first portion 108 and the second portion 110. For example, when an operator is intended to assembly the solar panel 112, the operator may release the second portion 110 from the first portion 108, and assembly the solar panel 112 on the first portion 108. Based on the assembly of the solar panel 112 with the first portion 108, the operator may re-couple the second portion 110 with the first portion 108. Therefore, such configuration may substantially ease the assembly of the solar panel 112 in between the first portion 108 and the second portion 110 of the slider component 104.

The first portion 108 may have a suitable design, shape, and structure, which may be configured to be located at a first height 108A from the roof molding recess area 106B. In an embodiment, the first portion 108 may be disposed on a base (not shown) of the roof molding recess area 106B at the first height 108A. In an example, the first height 108A may be equal to a height of the roof molding recess area 106B measured from the base (i.e., the roof) of the vehicle 106. Therefore, as the first portion 108 of the slider component 104 is configured to be substantially flushed with the roof molding recess area 106B, there may not be a requirement for a separate roof mold, and thus, improves aesthetics of the vehicle 106.

In an embodiment, the first portion 108 may have a first length 108B that may be disposed at the first height 108A. In an example, the first length 108B may be equal to a length of the roof molding recess area 106B measured from the base (i.e., the roof) of the vehicle 106. Therefore, as the first length 108B of the first portion 108 is configured to be substantially flushed with the roof molding recess area 106B, there may not be a requirement for a separate roof mold, and thus, improves aesthetics of the vehicle 106. The second portion 110 may extend from the first portion 108 that may be flushed with the roof molding recess area 106B, to secure the solar panel 112 without impacting the aerodynamics of the vehicle 106. In another example, the first length 108B may be less than the length of the roof molding recess area 106B measured from the base of the vehicle 106. In such cases, as the first length 108B of the first portion 108 is sunken-fit (for example, at a minimal height and a minimal length) with the roof molding recess area 106B, the solar panel 112 may be assembled with the roof of the vehicle 106, at a further low-profile, which may further improve the aerodynamics of the vehicle 106.

In another embodiment, the first portion 108 may have a substantially rectangular profile, which may be configured to mate with the roof molding recess area 106B. For example, the first portion 108 may extend along the height and the length of the roof molding recess area 106B and further has the substantially rectangular profile (for example, a rectangular male portion) that may align and mate with a rectangular profile (for example, a rectangular female portion) of the roof molding recess area 106B. In another embodiment, the first portion 108 may have a substantially arcuate profile, which may be configured to mate with corresponding arcuate profile of the roof molding recess area 106B. In yet another embodiment, the first portion 108 may have a polygonal profile, which may be configured to mate with the corresponding polygonal profile of the roof molding recess area 106B.

In yet another embodiment, the first portion 108 may have a substantially L-shaped profile, which may be configured to mate with the roof molding recess area 106B. For example, the substantially L-shaped profile may be formed in-phase with edges of the roof molding recess area 106B and may facilitate a flushed configuration with the edges of the roof molding recess area 106B. In an example, the L-shaped profile may have a horizontal section and a vertical section. The horizontal section may have a length that may be more than a length of the vertical section of the L-shaped profile.

Therefore, the solar panel 112 may be assembled with the roof of the vehicle 106, at a further low-profile, which may further improve the aerodynamics of the vehicle 106.

In an alternate embodiment, the first portion 108 may be the roof mold that may be substantially flushed to the roof molding recess area 106B. For example, there may be instances that the roof mold may not be removed from the roof molding recess area 106B as shown in FIG. 2. In such instances, such roof mold may act as the first portion 108 that may facilitate the sub-structure for the second portion 110. Description of such roof mold is described further, for example, in FIG. 2.

The second portion 110 may have a suitable design, shape, and structure, which may be configured to be located at a second height 110A from the roof molding recess area 106B. In an embodiment, the second portion 110 may be disposed on the first portion 108 at the second height 110A from the base of the roof molding recess area 106B. In an example, the second height 110A may be equal to twice the height of the roof molding recess area 106B measured from the base (i.e., the roof) of the vehicle 106. In another example, the second portion 110 may have a dimension ranging from 4 mm to 35 mm. In another example, the second portion 110 may have a dimension above 35 mm.

In an embodiment, the second portion 110 may have a second length 110B that may be disposed at the second height 110A. In an example, the second length 110B may be equal to a length of the roof molding recess area 106B measured from the base (i.e., the roof) of the vehicle 106. In an embodiment, the second length 110B may be substantially same as the first length 108B. For example, the first portion 108 and the second portion 110 may be substantially identical to each other and the first length 108B of the first portion 108 is substantially same as the second length 110B of the second portion 110. In another example, the first portion 108 and the second portion 110 may be identical and coupled opposing each other to form an hour-glass profile. The hour-glass profile is merely an example. The first portion 108 and the second portion 110 may be combined with each other to form a plurality of structural configurations based on user requirements. For example, the first portion 108 and the second portion 110 may coupled directing each other to from a convergent divergent (CD) configuration. In another example, the first portion 108 and the second portion 110 may have a substantially spherical configuration and both portions combined with each other to form a dumbbell configuration. In an embodiment, the first length 108B may be different from the second length 110B. For example, the first length 108B may be lesser than the second length 110B and may be combined with each other to form the plurality of structural configurations based on user requirements. As another example, the second length 110B may be lesser than the first length 108B and may be combined with each other to form plurality of structural configurations based on user requirements.

In another embodiment, the second length 110B of the second portion 110 may be equal to the length of the roof molding recess area 106B measured from the base (i.e., the roof) of the vehicle 106. Therefore, as the second length 110B of the second portion 110 is configured to be disposed at a substantially low-profile, the solar panel 112 may also be assembled at the substantially low-profile, which may further improve the aerodynamics of the vehicle 106. In an example, the second portion 110 may be coupled to the first portion 108, such that, the second portion 110 may be removably engaged to the first portion 108 to couple the solar panel 112 between the second portion 110 and the first portion 108 at the low-profile from the roof of the vehicle 106. In an assembly event, the second portion 110 may be released from the first portion 108, and the solar panel 112 may be disposed between the first portion 108 and the second portion 110, to assemble the solar panel 112 at the low-profile from the roof of the vehicle 106.

In yet another embodiment, the second length 110B may be less than the length of the roof molding recess area 106B measured from the base of the vehicle 106. In such case, the second length 110B of the second portion 110 may facilitate a substantially minimal low-profile for the assembly of the solar panel 112, which further improves the aerodynamics of the vehicle 106. The substantially minimal low-profile of the second portion 110 may be less than the substantially low-profile of the second portion 110, and corresponding low-profiles may be selected based on an operator's preference. For example, for vehicles (such as sports vehicles, high-end vehicles, etc.) that require a minimal aerodynamic drag, the second portion 110 may be disposed at the substantially minimal low-profile. In another example, for vehicles (such as general utility vehicles, low-end vehicles, etc.) that is intended for general transportation, the second portion 110 may be disposed at the substantially low profile.

In yet another embodiment, the second portion 110 may have a substantially arcuate profile, which may be configured to mate with the solar panel 112. For example, the second portion 110 may extend along the height and the length of the roof molding recess area 106B and further has the substantially arcuate profile (for example, an arcuate female portion) that may align and mate with portions (for example, an arcuate male portion) of the solar panel 112. In another embodiment, the second portion 110 may have a substantially rectangular profile, which may be configured to mate with corresponding rectangular profile of the solar panel 112. In yet another embodiment, the second portion 110 may have a polygonal profile, which may be configured to mate with the corresponding polygonal profile of the solar panel 112.

In yet another embodiment, the second portion 110 may have a substantially L-shaped profile, which may be configured to mate with the solar panel 112. For example, the substantially L-shaped profile may be formed in-phase with edges of the solar panel 112 and may facilitate a flushed configuration with the edges of the solar panel 112. In an example, the L-shaped profile may have a horizontal section and a vertical section. The horizontal section may have a length that may be more than a length of the vertical section of the L-shaped profile. Therefore, the solar panel 112 may be assembled with the roof of the vehicle 106, at a further low-profile, which shall further improve the aerodynamics of the vehicle 106.

In an alternate embodiment, the second portion 110 may be directly coupled to the roof mold that may be substantially flushed to the roof molding recess area 106B. For example, there may be instances that the roof mold may not be removed from the roof molding recess area 106B as shown in FIG. 2. In such instances, such roof mold may act as the first portion 108 that may facilitate the sub-structure for the second portion 110 and the second portion 110 may form the super-structure on the roof mold of the vehicle 106 to assemble the solar panel 112. Description of such roof mold is described further, for example, in FIG. 2.

The solar panel 112 may have a suitable design, shape, and structure, which may be configured to convert sunlight into electricity based on a plurality of photovoltaic (PV) cells that may be disposed as an array in the solar panel 112. In an embodiment, the solar panel 112 may be a flexible solar panel that may be configured to be slidably coupled to the second portion 110 of the slider component 104. In another embodiment, the solar panel 112 may be a rigid panel that may be removably coupled to the second portion 110 of the slider component 104. The solar panel 112 shown in FIG. 1, has a substantially rectangular profile. However, the solar panel 112 may have any other structural profile, which may include, but not limited to, a substantially square profile, a substantially polygonal profile, and the like. Such structural profile of the solar panel 112 may be selected to match the structural profile of the roof of the vehicle 106 and a space between slider components (such as the slider component 104) that may be disposed on opposing edges of the vehicle 106.

In another embodiment, the solar panel 112 may be removably coupled to the second portion 110 of the slider component 104 at a third height 112A, which may be less than the second height 110A of the second portion 110. Such configuration may facilitate the solar panel 112 to be disposed at the low-profile from the roof of the vehicle 106. Therefore, as the solar panel 112 is located at the low-profile from the roof of the vehicle 106, there may be substantial improvement in the aerodynamics of the vehicle 106 in addition to the improvement in the aesthetics of the vehicle 106.

In an embodiment, the solar panel 112 may be disposed at the third height 112A, such that, a temperature of a cabin (not shown) of the vehicle 106 is controlled based on a location of the solar panel 112. For example, in certain instances, there may be a larger viewing glass compared to a standard viewing glass, disposed on the roof of the vehicle 106. Such larger viewing glass may be heated/cooled quickly and may affect the temperature of the cabin of the vehicle 106. In such instances, the solar panel 112 may be configured to be disposed at a suitable location to absorb variations in temperature of an external environment associated with the vehicle 106 and maintain the cabin at a constant temperature, which enhances a comfort of an occupant in the vehicle 106.

In operation, the roof-mounted solar panel assembly 102 or the operator associated with the roof-mounted solar panel assembly 102 may be configured to dispose the slider component 104 at the roof molding recess area 106B of the vehicle 106. The slider component 104 may have the first portion 108 (for example, a sub-structure of the hourglass-shaped slider) and the second portion 110 (for example, a super-structure of the hourglass-shaped slider). The first portion 108 may be located at the first height 108A from the roof molding recess area 106B. In an example, the first height 108A may be equal to the height of the roof molding recess area 106B measured from the roof of the vehicle 106. Therefore, as the first portion 108 of the slider component 104 is configured to be substantially flushed with the roof molding recess area 106B, there may not be a requirement for a separate roof mold, and thus, improves aesthetics of the vehicle 106.

The second portion 110 may be located at the second height 110A from the roof molding recess area 106B. In an example, the first portion 108 may have the first length 108B and the second portion 110 may have the second length 110B. In an embodiment, the first length 108B may be substantially same as the second length 110B. Such configuration may facilitate the slider component 104 to be disposed at the low-profile from the roof of the vehicle 106. Therefore, as the slider component 104 is located at the low-profile from the roof of the vehicle 106, there may be substantial improvement in the aerodynamics of the vehicle 106 in addition to the improvement in the aesthetics of the vehicle 106.

The slider component 104 may also be used to hold other components (such as solar panels, cargos, etc.) on to the roof of the vehicle 106. For example, the roof-mounted solar panel assembly 102 may further include the solar panel 112 that may be removably coupled to the second portion 110 of the slider component 104 at the third height 112A, which may be less than the second height 110A of the second portion 110. Therefore, as the solar panel 112 is also located at the low-profile from the roof of the vehicle 106, there may be further improvement in the aerodynamics of the vehicle 106 in addition to the improvement in the aesthetics of the vehicle 106, despite assembling the solar panel 112 in the vehicle 106.

FIG. 2 is a diagram that illustrates a first exemplary scenario for a roof-mounted solar panel assembly of a vehicle, in accordance with an embodiment of the disclosure. FIG. 2 is explained in conjunction with elements from FIG. 1. With reference to FIG. 2, there is shown a first exemplary scenario 200 that shows the roof-mounted solar panel assembly 102 disposed on a roof mold 202. The roof-mounted solar panel assembly 102 may include a slider 204 that may be disposed on the roof mold 202.

The roof mold 202 may include a suitable design, structure, and shape, which may be configured to conceal the roof molding recess area 106B (shown in FIG. 1) of the vehicle 106. In an embodiment, the roof mold 202 may be a panel that may be configured to be assembled planar to the roof molding recess area 106B. Based on the assembly, the roof mold 202 may substantially flush with the roof molding recess area 106B, and further improve the aerodynamics of the vehicle 106.

In another embodiment, the first portion 108 (such as, the roof mold 202) may have a substantially rectangular profile, which may be configured to mate with the roof molding recess area 106B of the vehicle 106. The substantially rectangular profile is merely an example and the first portion 108 may have any other structural profile, for example, but not limited to, a substantially cylindrical profile, a substantially polygonal profile, and the like.

In yet another embodiment, the first portion 108 may be the roof mold 202 that may be substantially flushed to the roof molding recess area 106B and the second portion 110 may be the slider 204 that may be coupled to the first portion 108. For example, there may be instances that the roof mold 202 may not be removed from the roof molding recess area 106B as shown in FIG. 2. In such instances, the roof mold 202 may act as the first portion 108 that may facilitate the sub-structure for the second portion 110. The second portion 110 may form the super-structure directly on the roof mold 202 that may be substantially flushed to the roof molding recess area 106B.

In yet another embodiment, the first portion (such as, the roof mold 202) may have a substantially L-shaped profile, which may be configured to mate with the roof molding recess area 106B. For example, the roof mold 202 may have the substantially L-shaped profile that may mate with corresponding L-shaped profile of the roof molding recess area 106B, such that, the roof mold 202 may form a flushed configuration with the roof molding recess area 106B.

The second portion 110 (such as, the slider 204) may have the hour-glass profile, which may be configured to control a drag of the vehicle 106. For example, the slider 204 may be disposed at a substantially low-profile, so that, the solar panel 112 may be assembled on the roof of the vehicle 106, via the slider 204, without impacting the drag associated with the aerodynamics of the vehicle 106.

In another embodiment, the second portion (such as, the slider 204) may have a substantially arcuate profile, which may be configured to control the drag of the vehicle 106. For example, the slider 204 may have the substantially arcuate profile that conforms to corresponding arcuate profile of the solar panel 112. The slider 204 may be disposed at a substantially low-profile, such that, the solar panel 112 may be assembled with the slider 204, without impacting the drag associated with the aerodynamics of the vehicle 106. The slider 204 described having the hour-glass profile or the substantially arcuate profile, is merely an example. Other examples of the slider 204 may include, but not limited to, a dumbbell profile, a polygonal profile, and the like.

Figure 3:
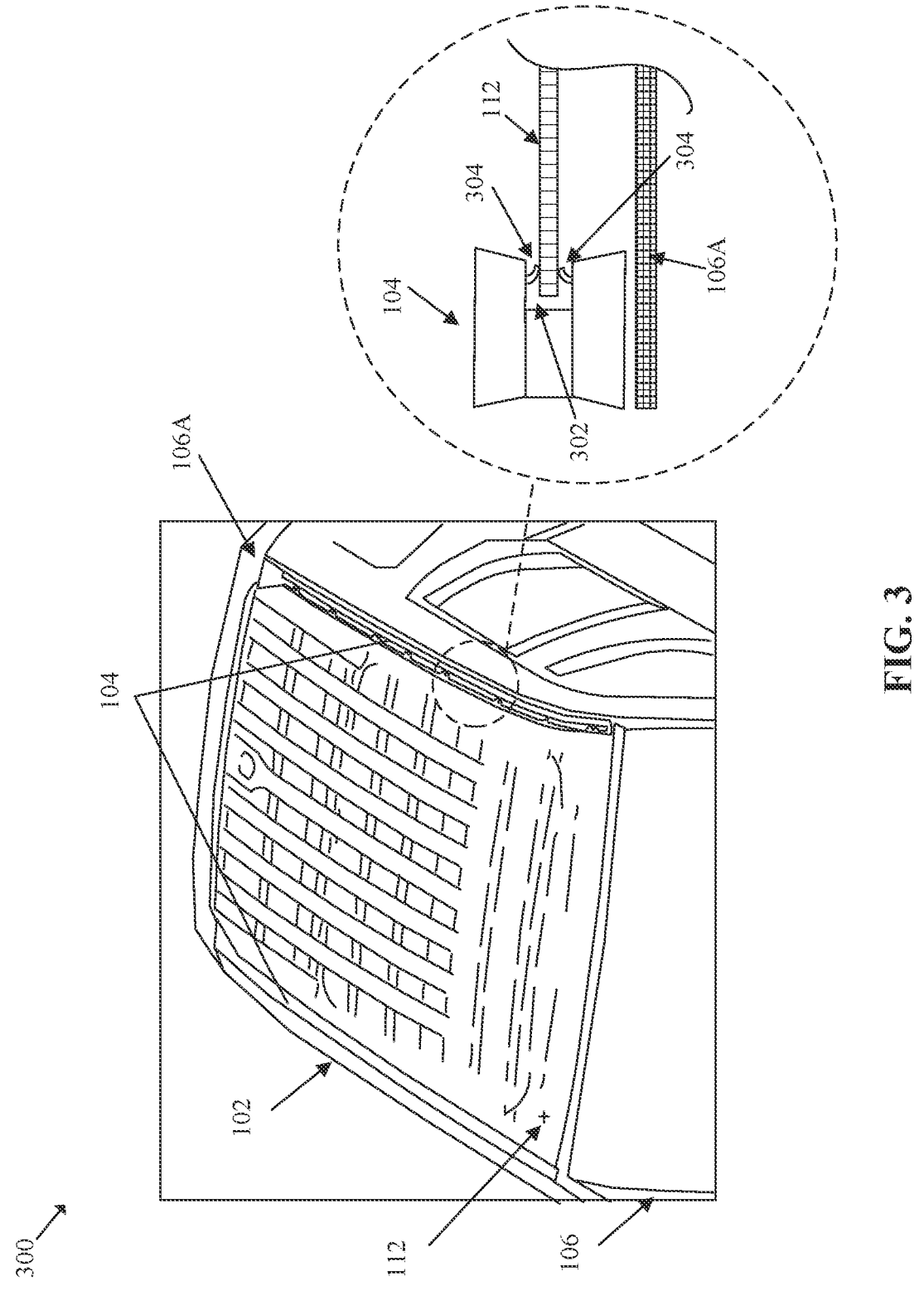
FIG. 3 is a diagram that illustrates a second exemplary scenario for a roof-mounted solar panel assembly of a vehicle, in accordance with an embodiment of the disclosure.

FIG. 3 is a diagram that illustrates a second exemplary scenario for a roof-mounted solar panel assembly of a vehicle, in accordance with an embodiment of the disclosure. FIG. 3 is explained in conjunction with elements from FIG. 1 and FIG. 2. With reference to FIG. 3, there is shown a second exemplary scenario 300 that shows the roof-mounted solar panel assembly 102.

In an embodiment, the second portion 110 (shown in FIG. 1) of the slider component 104 may have a slot 302 to receive the solar panel 112. For example, the slot 302 may be located on an internal surface of the second portion 110, such that, the slot 302 may be configured to engage with the solar panel 112. The solar panel 112 may have a flexible structural profile that may be configured to be inserted in the slot 302 of the second portion 110 of the slider component 104. In such configuration, the slot 302 of the second portion 110 may firmly secure the solar panel 112 and protect the solar panel 112 from the external environment associated with the vehicle 106.

In another embodiment, the roof-mounted solar panel assembly 102 may also include a lip seal 304 disposed between the solar panel 112 and the slider component 104. In an embodiment, the lip seal 304 may form a cushion for the solar panel 112, so that, the solar panel 112 may not be damaged from the external environment associated with the vehicle 106. In an example, the lip seal 304 may seal the solar panel 112 with the slider component 104, such that, the solar panel 112 may form an interference fit with the lip seal 304. In yet another embodiment, a low friction coating may be coated on at least one of the lip seal 304 or the solar panel 112, to ease sliding of the solar panel 112 with the lip seal 304.

In certain instances, roads may not be smooth and may include interferences, such as speed breakers. In such interferences, the vehicle 106 may tend to wobble, which may impact a structural integrity of the solar panel 112. However, the lip seal 304 may absorb such impact and forms a cushion for the solar panel 112, so that, the solar panel 112 may not be damaged even in such instances.

Figure 4:
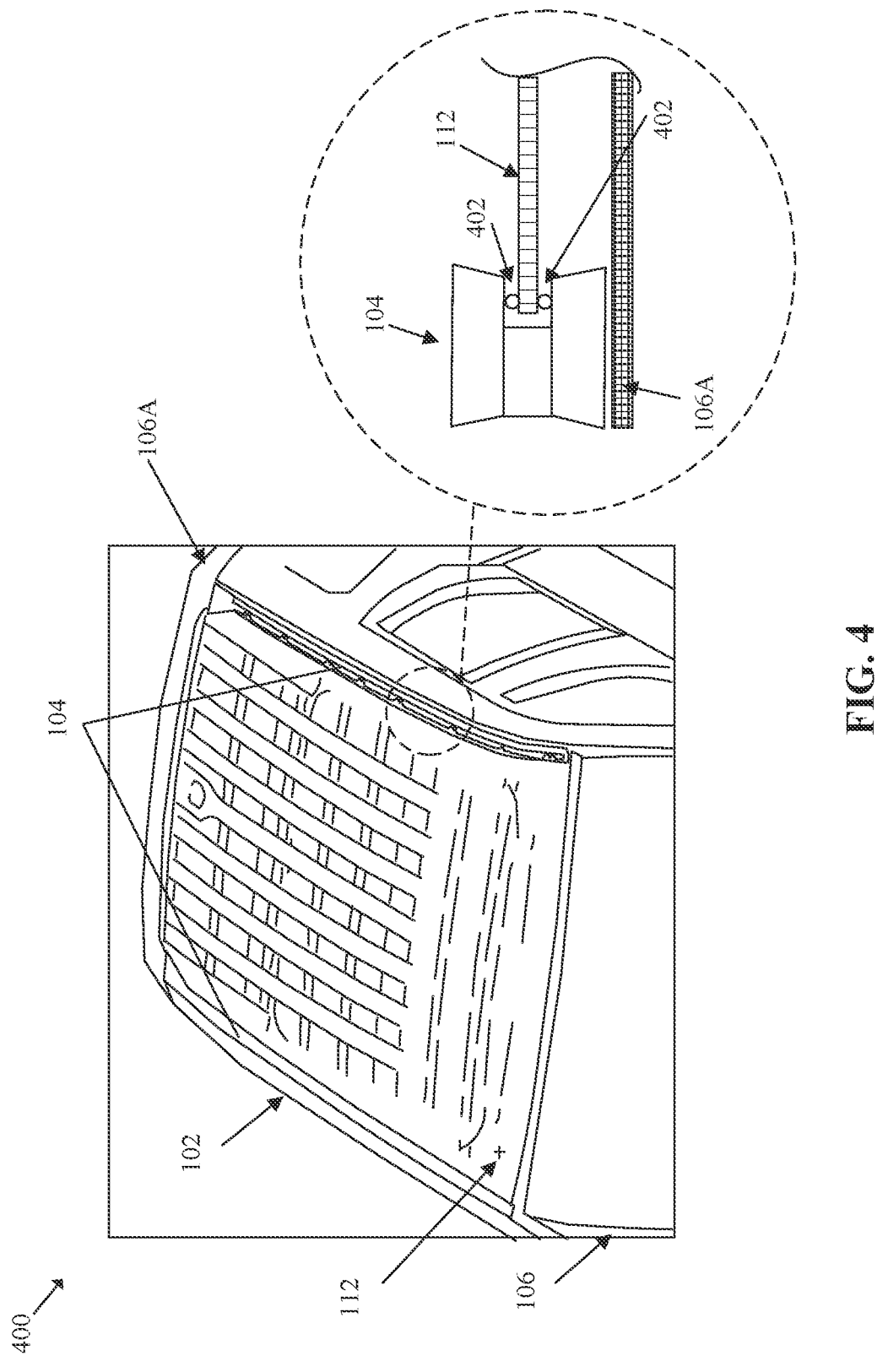
FIG. 4 is a diagram that illustrates a third exemplary scenario for a roof-mounted solar panel assembly of a vehicle, in accordance with an embodiment of the disclosure.

FIG. 4 is a diagram that illustrates a third exemplary scenario for a roof-mounted solar panel assembly of a vehicle, in accordance with an embodiment of the disclosure. FIG. 4 is explained in conjunction with elements from FIG. 1, FIG. 2, and FIG. 3. With reference to FIG. 4, there is shown an exemplary scenario 400, that shows the roof-mounted solar panel assembly 102.

In an embodiment, the roof-mounted solar panel assembly 102 may further include a plurality of rollers 402 that may be disposed between the solar panel 112 and the slider component 104. The plurality of rollers 402 may include a suitable design, shape, and structure, which may be configured to facilitate sliding of the solar panel 112. In an embodiment, the solar panel 112 may form a slidable fit with the slider component 104, via the plurality of rollers 402. For example, when the solar panel 112 is assembled in the first portion 108 of the slider component 104, the plurality of rollers 402 may enhance a slidable translation of the solar panel 112 with the slider component 104, such that, there may not be any damage in the solar panel 112 or the slider component 104.

Figure 5:
FIG. 5 is a flowchart that illustrates exemplary operations for forming a roof-mounted solar panel assembly, in accordance with an embodiment of the disclosure.

FIG. 5 is a flowchart that illustrates exemplary operations for forming a roof-mounted solar panel assembly, in accordance with an embodiment of the disclosure. FIG. 5 is explained in conjunction with elements from FIG. 1, FIG. 2, FIG. 3, and FIG. 4. With reference to FIG. 5, there is shown a flowchart 500. The operations from 502 to 504 may be implemented, for example, by the roof-mounted solar panel assembly 102 or an operator associated with the roof-mounted solar panel assembly 102. The operations of the flowchart 500 may start at 502.

At 502, the slider component 104 may be disposed at the roof molding recess area 106B of the vehicle 106, which has the first portion 108 located at the first height 108A from the roof molding recess area 106B and has the second portion 110 located at the second height 110A from the roof molding recess area 106B. In an embodiment, the operator, or the roof-mounted solar panel assembly 102, may dispose the slider component 104 at the roof molding recess area 106B of the vehicle 106, as described further, for example in, FIG. 1, FIG. 2, and FIG. 3.

At 504, the solar panel 112 may be coupled to the second portion 110 of the slider component 104 at the third height 112A, which is less than the second height 110A of the second portion 110. In an embodiment, the operator, or the roof-mounted solar panel assembly 102, may couple the solar panel 112 to the second portion 110 of the slider component 104 at the third height 112A, which is less than the second height 110A of the second portion 110, as described further, for example in, FIG. 1, FIG. 2, and FIG. 3.

The flowchart shown in FIG. 5 is illustrated as discrete operations, such as from 502 to 504, which relates to the method of forming the roof-mounted solar panel assembly 102. However, in certain embodiments, such discrete operations may be further divided into additional operations, combined into fewer operations, or eliminated, depending on the implementation without detracting from the essence of the disclosed embodiments.

For the purposes of the present disclosure, expressions, such as "including", "comprising", "incorporating", "consisting of", "have", "is", used to describe and claim the present disclosure, are intended to be construed in a non-exclusive manner, namely allowing for items, components or elements not explicitly described also to be present. Reference to the singular is also to be construed to relate to the plural. Further, all joinder references (e.g., attached, coupled, connected, or the like) are used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A roof-mounted solar panel assembly, comprising:
a slider component disposed at a roof molding recess area of a vehicle, the slider component has a first portion and a second portion, wherein the first portion is located at a first height from the roof molding recess area and the second portion is located at a second height from the roof molding recess area; and
a solar panel is removably coupled to the second portion of the slider component at a third height, which is less than the second height of the second portion.

2. The roof-mounted solar panel assembly according to claim 1, wherein,
the first portion has a first length disposed at the first height;
the second portion has a second length disposed at the second height; and
the first length is substantially same as the second length.

3. The roof-mounted solar panel assembly according to claim 1, wherein,
the first portion is substantially flushed to the roof molding recess area; and
the second portion extends from the first portion.

4. The roof-mounted solar panel assembly according to claim 1, wherein the first portion and the second portion forms an hour-glass profile.

5. The roof-mounted solar panel assembly according to claim 1, wherein the second portion has a dimension ranging from 4 mm to 35 mm.

6. The roof-mounted solar panel assembly according to claim 1, wherein,
the first portion is a roof mold that is substantially flushed to the roof molding recess area; and
the second portion is a slider that is coupled to the first portion.

7. The roof-mounted solar panel assembly according to claim 1, wherein,
the first portion has a substantially rectangular profile, which is configured to mate with the roof molding recess area; and
the second portion has an hour-glass profile, which is configured to control a drag of the vehicle.

8. The roof-mounted solar panel assembly according to claim 1, wherein,
the second portion is coupled to the first portion, and wherein the second portion is removably engaged to the first portion to couple the solar panel between the second portion and the first portion.

9. The roof-mounted solar panel assembly according to claim 1, wherein,
the first portion has a substantially L-shaped profile, which is configured to mate with the roof molding recess area; and
the second portion has a substantially arcuate profile, which is configured to control a drag of the vehicle.

10. The roof-mounted solar panel assembly according to claim 1, wherein the second portion of the slider component has a slot to receive the solar panel, and wherein the solar panel has a flexible structural profile.

11. The roof-mounted solar panel assembly according to claim 1, further comprising a lip seal disposed between the solar panel and the slider component, wherein the solar panel forms an interference fit with the slider component, via the lip seal.

12. The roof-mounted solar panel assembly according to claim 1, further comprising a plurality of rollers disposed between the solar panel and the slider component, wherein the solar panel forms a slidable fit with the slider component, via the plurality of rollers.

13. The roof-mounted solar panel assembly according to claim 1, wherein the solar panel is disposed at the third height, such that, a temperature of a cabin of the vehicle is controlled based on a location of the solar panel.

14. The roof-mounted solar panel assembly according to claim 1, wherein the slider component is coupled with a plurality of end caps on opposing ends, the plurality of end caps are configured to limit a noise generated from the slider component.

15. The roof-mounted solar panel assembly according to claim 1, wherein the roof molding recess area is located on a roof rail of the vehicle; and the slider component is directly coupled to the roof rail of the vehicle.

16. A roof-mounted solar panel assembly, comprising:
a slider component disposed at a roof molding recess area of a vehicle, the slider component has a first portion and a second portion, wherein the first portion is located at a first height from the roof molding recess area and the second portion is located at a second height from the roof molding recess area; and
a solar panel is removably coupled to the second portion of the slider component and located within the second height.

17. The roof-mounted solar panel assembly according to claim 16, wherein,
the first portion is substantially flushed to the roof molding recess area; and
the second portion extends from the first portion.

18. The roof-mounted solar panel assembly according to claim 16, wherein the first portion and the second portion forms an hour-glass profile.

19. A method, comprising:
disposing a slider component at a roof molding recess area of a vehicle, the slider component has a first portion and a second portion, wherein the first portion is located at a first height from the roof molding recess area and the second portion is located at a second height from the roof molding recess area; and
coupling a solar panel to the second portion of the slider component at a third height, which is less than the second height of the second portion.

20. The method according to claim 19, wherein
the first portion has a first length disposed at the first height;
the second portion has a second length disposed at the second height; and
the first length is substantially same as the second length.

* * * * *